UNITED STATES PATENT OFFICE.

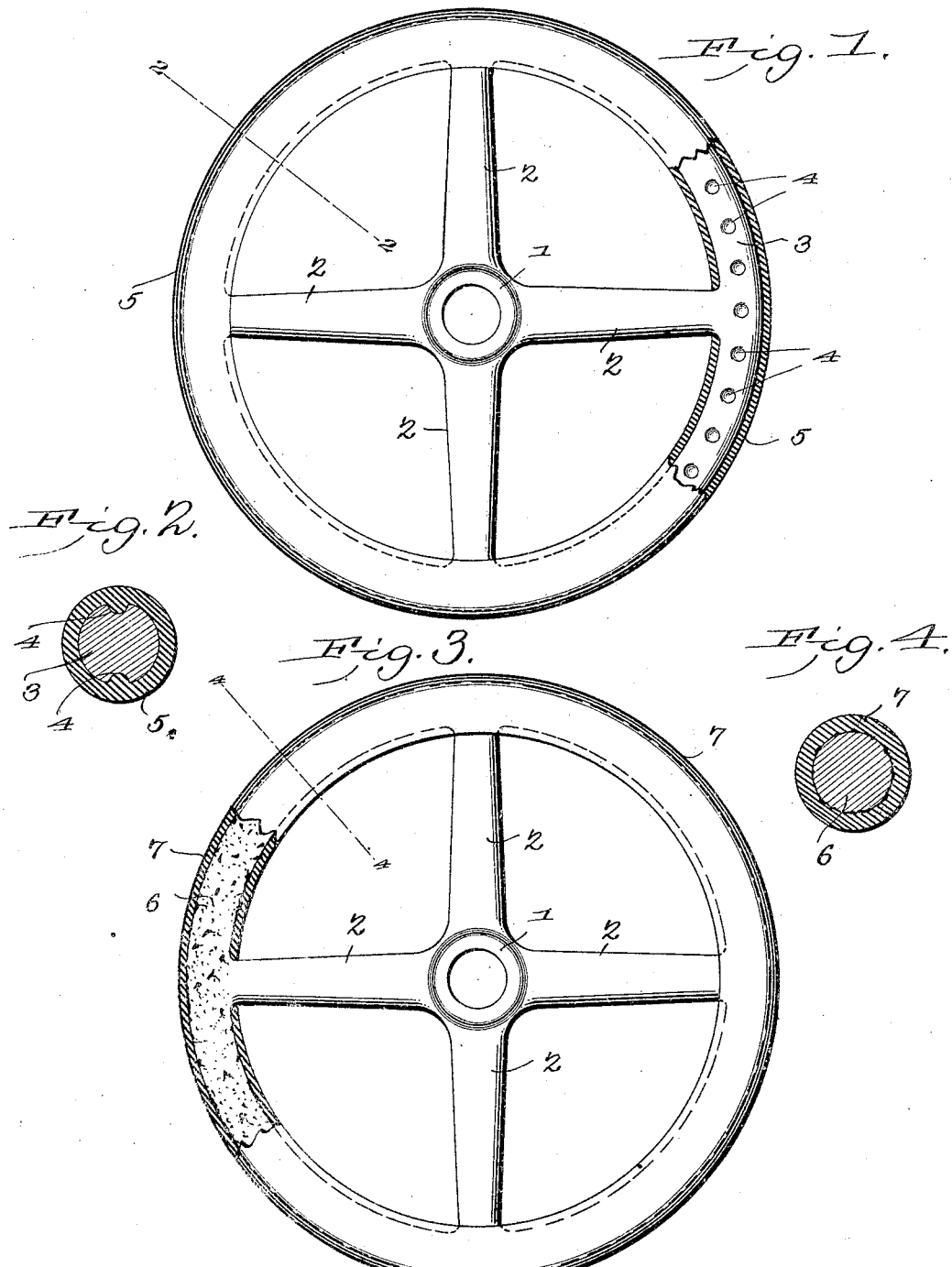

JOHN W. JOHNSON, OF KOKOMO, INDIANA.

STEERING-WHEEL.

No. 804,955.　　　　Specification of Letters Patent.　　　Patented Nov. 21, 1905.

Application filed December 16, 1904. Serial No. 237,167.

*To all whom it may concern:*

Be it known that I, JOHN W. JOHNSON, a citizen of the United States, residing at Kokomo, in the county of Howard and State of Indiana, have invented a new and useful Steering-Wheel, of which the following is a specification.

This invention relates generally to steering-wheels, and more particularly to that class employed upon automobiles, boats, flying-machines, and the like.

The object of the invention is to improve the appearance, increase the efficiency, and render wheels of this character more substantial in use by obviating warping, splitting, breaking of joints, the wearing off of varnish and paint, and other objectionable features common to the ordinary wood rim in general use.

With the above and other objects in view, as will appear as the nature of the invention is better understood, the same consists in the novel form of steering-wheel hereinafter fully described and claimed.

In the accompanying drawings, forming a part of this specification, and in which like characters of reference indicate corresponding parts, Figure 1 is a view in elevation, partly in section, exhibiting one form of embodiment of the invention as applied to the rim of a steering-wheel. Fig. 2 is a view in transverse section on the line 2 2, Fig. 1. Fig. 3 is a view similar to Fig. 1, showing another form of the invention. Fig. 4 is a transverse sectional view taken on the line 4 4, Fig. 3.

Referring to the drawings and to Fig. 1, 1 designates the hub of an ordinary steering-wheel, 2 the spokes, and 3 the rim. The rim is provided on one or more sides with pits or depressions 4, which are engaged by the sheath or envelop 5, of hard rubber, which is vulcanized to the rim in any preferred manner and completely envelops the same except at that part where the spokes join the rim, the portions of the sheath that enter the pockets serving as anchors to lock the sheath to the rim. Of course under long continued use the sheath may become loose upon the rim; but as it entirely envelops the same, as above stated, it will be seen that disconnection therefrom is rendered impossible, and, further, by the employment of the pits danger of creepage or longitudinal movement is reduced to a minimum.

In the form of the invention shown in Figs. 3 and 4 the rim 6 is rough cast, while the spokes and hub are finished or dressed in the usual manner. By leaving the rim rough cast not only is the cost of production of the wheel materially reduced, but the sand-pits and irregularities serve as anchoring means to cause the sheath 7 to be firmly combined with the rim against slippage.

Having thus described the invention, what is claimed is—

A wheel having a pitted rim, and a sheet or envelop of hard rubber permanently vulcanized upon the rim and anchored in position by the pits.

In testimony that I claim the foregoing as my own I have hereto affixed my signature in the presence of two witnesses.

JOHN W. JOHNSON.

Witnesses:
　GEORGE KINGSTON,
　JOHN P. GRACE.